United States Patent
Hosoi et al.

(10) Patent No.: US 6,880,928 B2
(45) Date of Patent: Apr. 19, 2005

(54) INK JET RECORDING METHOD AND INK JET RECORDING PAPER

(75) Inventors: Kiyoshi Hosoi, Ebina (JP); Chizuru Koga, Ebina (JP); Takashi Ogino, Ebina (JP)

(73) Assignee: Fuji Xerox Co., Ltd., Tokyo (JP)

(*) Notice: Subject to any disclaimer, the term of this patent is extended or adjusted under 35 U.S.C. 154(b) by 0 days.

(21) Appl. No.: 10/457,432

(22) Filed: Jun. 10, 2003

(65) Prior Publication Data

US 2003/0227531 A1 Dec. 11, 2003

(30) Foreign Application Priority Data

Jun. 11, 2002 (JP) ........................................ 2002-169820

(51) Int. Cl.⁷ ................................................. B41J 2/01
(52) U.S. Cl. ........................ 347/105; 347/101; 347/100
(58) Field of Search ................................ 347/105, 101, 347/100, 96; 428/195, 32.1, 32.6

(56) References Cited

U.S. PATENT DOCUMENTS

| | | | | | |
|---|---|---|---|---|---|
| 4,554,181 | A | * | 11/1985 | Cousin et al. | 347/105 |
| 5,270,103 | A | * | 12/1993 | Oliver et al. | 347/105 |
| 5,531,818 | A | * | 7/1996 | Lin et al. | 347/100 |
| 2003/0038869 | A1 | * | 2/2003 | Kaneko et al. | 347/100 |

FOREIGN PATENT DOCUMENTS

| | | | | |
|---|---|---|---|---|
| JP | 3-38375 | 2/1991 | | |
| JP | 3-38376 | 2/1991 | | |
| JP | 3-199081 | 8/1991 | | |
| JP | 7-257017 | 10/1995 | | |
| JP | 7-276786 | 10/1995 | | |
| JP | 8-216498 | 8/1996 | | |
| JP | 9-234946 | 9/1997 | | |
| JP | 11-343435 | 12/1999 | | |
| JP | 2000-066437 | * | 3/2000 | G03G/7/00 |
| JP | 2000-94825 | 4/2000 | | |
| JP | 3172298 B | 3/2001 | | |

* cited by examiner

*Primary Examiner*—Manish Shah
(74) *Attorney, Agent, or Firm*—Morgan Lewis & Bockius LLP

(57) ABSTRACT

In an ink jet recording method, a surface of a recording paper, in which a base paper contains a pulp fiber and a filler, one surface of the base paper being coated with a polyvalent metal salt in a coating amount of from 0.1 to 3 g/m$^2$, having a basis weight of from 63 to 100 g/m$^2$ and an internal bond strength of from 0.05 to 0.2 N·m is printed using an ink of at least one color made of at least a pigment, a water-soluble organic solvent, water and a surfactant and having a surface tension of from 25 to 37 mN/m. According to the method, the color reproduction is improved, the inter color bleeding and the feathering of characters are reduced, the double-sided printability is provided by reducing curling and cockling occurring immediately after printing, and curling and cockling occurring after allowing to stand and drying are also reduced.

19 Claims, No Drawings

INK JET RECORDING METHOD AND INK JET RECORDING PAPER

BACKGROUND OF THE INVENTION

1. Field of the Invention

The present invention relates to an ink jet recording method using a recording paper and ink, and an ink jet recording paper.

2. Description of the Related Art

An ink jet recording system has characteristics that coloration is easy, a consumption energy is decreased, a noise in recording is low and a production cost of a printer can be reduced. Accordingly, it attracts much interest not only in domestic use but also in offices. Further, since a high image quality, a high speed and a high reliability are lately being required, ink jet printers for offices have drawn increasing attention.

When the ink jet printers are used in offices, printing is most frequently performed on a plain paper. In the ink jet printers for offices, it is thus quite important to improve recordability to a plain paper.

In ordinary full color ink jet printers for offices, in order to reduce inter-color bleeding and a black character image, ink containing a pigment as a colorant and having a low permeability in paper (recording paper) is mainly used as black ink, and ink containing a dye as a colorant and having a high permeability in paper as color ink respectively. With the use of such inks, a black density influencing an image quality (black image quality) of the black character image and character feathering were reduced, but character feathering of the color image quality could not be reduced. Further, when an image with a high recording density was printed for increasing a permeability of color ink in paper as described above, there were problems that curling and cockling of a recording paper immediately after printing occurred greatly making it impossible to print both surfaces immediately after printing and curling and cockling after allowing to stand and drying occurred greatly. Thus, an image quality could not be consistent with reduction of curling and cockling of a recording paper.

In order to solve a problem of an image quality in using a plain paper, JP-A-7-257017 and JP-A-8-216498 disclose a recording method in which a material having an opposite ionicity to that of a water-soluble dye in ink is coated on a surface of a paper and the surface of the paper is recorded with the ink containing the water-soluble dye to increase a fixability of ink, reduce ink feathering and improve a water resistance and a color reproducibility of ink. In the recording method of these documents, the image quality is improved to some extent, but feathering of color characters cannot sufficiently be reduced, and the reduction of curling and cockling occurring immediately after printing at a high image density and the reduction of curling and cockling occurring after allowing to stand and drying are not studied. Accordingly, the paper cannot withstand the use as a document available in offices.

JP-A-11-343435 discloses a recording method in which a light-color solution made of an electrolyte is adhered to a recording medium (recording paper) which is then recorded with ink containing a pigment as a colorant to provide a high optical density and increase an image fixability. JP-A-2000-94825 discloses a recording method in which a dissociative polyvalent metal salt is coated on a paper surface which is then recorded with ink containing a pigment as a colorant to reduce a dullness and feathering and increase a water resistance. In these recording methods, it is possible to improve the image quality as well as to reduce curling and cockling occurring immediately after printing and curling and cockling after allowing to stand and drying. However, especially when printing is conducted at a high image density, occurrence of curling and cockling immediately after printing and occurrence of curling and cockling after allowing to stand and drying are not satisfactorily prevented. Thus, the paper cannot withstand the use as a document available in offices.

Meanwhile, in order to reduce curling and cockling after printing, for example, JP-A-3-38375 proposes a method in which curling and cockling are reduced by once humidifying a sheet formed to relax a stress of the sheet, JP-A-3-38376 a method in which an expansion after immersion in water in a CD direction of a paper is controlled to reduce curling and cockling, JP-A-3-199081 a method in which an expansion after immersion in water in MD and CD directions of a paper is adjusted to less than 1.3 times to reduce curling and cockling, JP-A-7-276786 a method in which an expansion after immersion in water in an operational direction of an ink jet portion is adjusted to less than 2.0% to reduce curling and cockling, Japanese Patent No. 3172298 a method in which a content of a pigment contained in a substrate (base paper) is from 5 to 35% by weight and an internal bond strength of a recording sheet (recording paper) is from 150 to 455 g/cm to reduce cockling of a coat-type ink jet recording sheet, respectively.

All of the methods of JP-A-3-38375, JP-A-3-38376, JP-A-3-199081 and JP-A-7-276786 can reduce curling and cockling, but are inappropriate for printing with a large jet amount of ink having a high permeability in paper and for printing in which a printing speed is high and a jet amount of ink per unit time is large. In the method described in Japanese Patent No. 3172298, an internal bond strength of a recording paper having an ink receptive layer is controlled in a certain range to reduce unevenness after printing. However, satisfactory effects against curling, cockling and unevenness cannot be provided only by controlling an internal bond strength. These methods are inappropriate especially for printing with a large jet amount of ink having a high permeability in paper and for printing in which a printing speed is high and a jet amount of ink per unit time is large.

JP-A-9-234946 proposes a method in which irreversible shrinkage factors in MD and CD directions of a recording paper when changing a relative humidity are controlled within fixed ranges to reduce curling and cockling occurring after allowing to stand and drying. Nevertheless, in case of printing with a large jet amount of ink having a high permeability in paper using a recording paper having a low basis weight, ink is permeated into the paper, and an absolute amount of a fiber shrunk after drying is wholly increased. Thus, no sufficient effect is obtained.

SUMMARY OF THE INVENTION

The invention has been made in view of these circumstances, and provides an ink jet recording method and an ink jet recording paper. According to an aspect of the invention, an ink jet recording method includes a step of printing on a surface of a recording paper by using a pigment ink of at least one color, in which the recording paper contains a base paper and a coating, the base paper contains a pulp fiber and a filler, a polyvalent metal salt is coated on one surface of the base paper in a coating amount of from 0.1 to 3 g/m², the recording paper has a basis weight of from 63 to 100 g/m² and an internal bond strength of from 0.05 to 0.2 N·m, the ink contains a water-soluble organic solvent, water and a surfactant and has a surface tension of from 25 to 37 mN/m. According to another aspect of the invention, an ink jet recording paper contains a base paper and a coating, the base paper is made mainly of a pulp fiber and a filler, and a polyvalent metal salt is coated on one surface of the base paper in a coating amount of from 0.1 to 3 g/m², the recording paper having a basis weight of from 63 to 100 g/m² and an internal bond strength of from 0.05 to 0.2 N·m. In the invention, in a document printed by an ink jet recording system, the color reproduction is increased, the inter-color bleeding and the feathering of characters are reduced, the double-sided printability is provided by reducing curling and cockling occurring immediately after printing, and curling and cockling occurring after allowing to stand and drying are also reduced.

In the ink jet recording method, the ink preferably may contain an anionic compound.

The anionic compound preferably may include a hydrophilic moiety and a hydrophobic moiety and may contain a carboxyl group as a hydrophilic functional group.

A monomer constituting the hydrophilic moiety is preferably at least one selected from acrylic acid, methacrylic acid, maleic acid and maleic anhydride, and a monomer constituting the hydrophobic moiety is preferably at least one selected from styrene and alkyl, aryl and alkylaryl esters of acrylic acid and methacrylic acid.

The polyvalent metal salt is preferably at least one selected from a calcium salt, a magnesium salt and an aluminum salt.

A viscosity of the ink may be from 1.5 to 5.0 mPa·s.

The prevent inventors have assiduously conducted investigations on an image quality in a plain paper, a double-sided printability provided by reduction of curling and cockling occurring immediately after printing and curling and cockling occurring after allowing to stand and drying. Consequently, they have found that for these problems to be consistent, it is required that an ink jet plain paper (recording paper) of which the internal bond strength is decreased by coating a polyvalent metal salt on the surface is printed with ink containing a pigment having a surface tension of from 25 to 37 mN/m as a colorant, and the problems are thereby attained for the first time.

The inventors have confirmed that curling and cockling occurring immediately after printing are due to abrupt elongation of a fibrous layer in a recording paper that absorbs water in aqueous ink and that the deeper the ink is permeated in the paper thickness direction, the more the curling and the cockling occur. They have further confirmed that curling and cockling occurring after allowing to stand and drying are due to shrinkage of the fibrous layer that absorbs ink and that the deeper the ink is permeated in the paper thickness direction, the more the curling and the cockling occur.

Consequently, the present inventors have assiduously conducted investigations on an expansion/shrinkage transmission due to absorption and desorption of water in a fibrous layer that absorbs ink and a permeability of ink in a paper thickness direction. As a result, it has been found that the expansion/shrinkage transmission due to absorption and desorption of water is closely related with an internal bond strength of a paper and that by decreasing an internal bond strength, it is possible to weaken the expansion/shrinkage transmission and reduce curling and cockling occurring immediately after printing and curling and cockling occurring after allowing to stand and drying.

Moreover, they have studied both ink and a paper with respect to a permeability of ink in a paper thickness direction, and have consequently found that a colorant of ink is changed to a pigment and the pigment in ink or the pigment and an anionic compound are instantaneously retained on a paper surface, whereby a solvent in ink is hardly permeated into the paper, which results in reducing curling and cockling occurring immediately after printing and curling and cockling occurring after allowing to stand and drying, and that in case of printing with a large jet amount of ink or printing with a large amount of ink per unit time without divided printing, unless both of the improvement approaches are used in combination, it is impossible to reduce curling and cockling occurring immediately after printing and curling and cockling occurring after allowing to stand and drying.

In addition, they have found that by instantaneously retaining the pigment in ink on the paper surface, as described above, a color reproduction, inter-color bleeding, black character blotting and color character feathering are outstandingly reduced, that the image quality and the reduction of curling and cockling can be consistent in the ink jet recording, and that the foregoing effects can be obtained even in printing both surfaces of a recording paper.

DESCRIPTION OF THE PREFERRED EMBODIMENTS

The invention is described in detail below.

The ink jet recording method of the invention includes a step of printing on a surface of a recording paper by using a pigment ink of at least one color, in which the recording paper contains a base paper and a coating, and the base paper contains a pulp fiber and a filler. And a polyvalent metal salt is coated on at least one surface of the base paper in a coating amount of from 0.1 to 3 g/m². The recording paper has a basis weight of from 63 to 100 g/m² and an internal bond strength of from 0.05 to 0.2 N·m. The ink is made of a pigment, a water-soluble organic solvent, water and a surfactant and having a surface tension of from 25 to 37 mN/m. It is preferable to print both surfaces of the recording paper.

First, the recording paper used in the invention is described below.

In the recording paper of the invention, the base paper made mainly of the pulp fiber and the filler is used. In the base paper, a chemical pulp can be used. Examples thereof include chemical pulps obtained by chemically treating fibrous materials such as wood, cotton, hemp and bast, for example, a hard wood bleached craft pulp, a hard wood unbleached craft pulp, a soft wood bleached craft pulp, a soft wood unbleached craft pulp, a hard wood bleached sulfite pulp, a hard wood unbleached sulfite pulp, a soft wood bleached sulfite pulp and a soft wood unbleached sulfite pulp. Further, a ground wood pulp obtained by mechanically pulping wood or chips, a chemimechanical pulp obtained by impregnating wood or chips with chemicals and then mechanically pulping the same, and a thermomechanical pulp obtained by cooking chips until slightly softening them and then pulping the resulting chips with a refiner are also available. These may be used either in the form of virgin pulps or by adding thereto a waste paper pulp as required.

Especially the pulps used in the form of virgin pulps are preferably those bleached by a bleaching method with chlorine dioxide without using a chlorine gas (Elementally Chlorine Free: ECF) or a bleaching method mainly with ozone/hydrogen peroxide without using a chlorine compound (Total Chlorine Free: TCF).

It is possible to blend, as a raw material of the waste paper pulp, unprinted waste portions of high quality paper, medium quality paper, ground wood paper and a roll of paper which are cut down, broken or trimmed in a bookbinding factory, a printing factory or a cutting factory; a high quality printed waste paper such as a high quality paper or a high quality coated paper printed or copied; a waste paper written in aqueous ink or oil-based ink or with pencil; a newspaper waste paper including a leaflet, such as a high quality paper, a high quality coated paper, a mechanical paper or a mechanical coat paper printed; and a waste paper such as a mechanical paper, a mechanical coated paper or a ground wood paper.

The waste paper pulp used in the base paper of the invention is preferably obtained by subjecting the foregoing waste paper raw material to at least one of ozone bleaching treatment and hydrogen peroxide treatment. For obtaining a paper having a higher whiteness, it is preferable that a mixing ratio of the waste paper pulp obtained by the bleaching treatment is 50 to 100%. Further, in view of reuse of resources, the mixing ratio of the waste paper pulp is preferably from 70 to 100%.

The ozone bleaching treatment acts to decompose a fluorescent dye ordinarily contained in a high quality paper, and the hydrogen peroxide bleaching treatment acts to prevent yellowing with alkali used in deinking. Especially a combination of these two treatments is known not only to expedite deinking of the waste paper but also to improve the whiteness of the pulp. Further, it acts to decompose and remove residual chlorine compounds in the pulp, and thus contributes greatly to decreasing a content of an organic halogen compound of the waste paper using the chlorine-bleached pulp.

The filler is added to the base paper used in the invention for adjusting an opacity, a whiteness and a surface property. Especially when it is required to decrease the halogen content in the paper, it is preferable to use a halogen-free filler. Examples of the available filler can include white inorganic pigments such as ground calcium carbonate, precipitated calcium carbonate, choke, kaolin, calcined clay, talc, calcium sulfate, barium sulfate, titanium dioxide, zinc oxide, zinc sulfide, zinc carbonate, aluminum silicate, calcium silicate, magnesium silicate, synthetic silica, aluminum hydroxide, alumina, sericite, white carbon, saponite, calcium montmorillonite, sodium montmorillonite and bentonite; and organic pigments such as an acrylic plastic pigment, polyethylene and urea resin. When the waste paper is blended, it is necessary to adjust the amount by previously estimating an ash content in the waste paper raw material.

The amount of the filler is not particularly limited. Preferably, it is from 5 to 30 parts by weight per 100 parts by weight of the pulp fiber.

Further, in the base paper, a neutral rosin sizing agent as used in neutral papermaking, an alkenyl succinic anhydride (ASA) sizing agent, an alkyl ketene dimer (AKD) sizing agent and a petroleum resin sizing agent can be used as an internal sizing agent. In order to suppress permeation of the polyvalent metal salt into the paper, it is preferable that the paper sizing degree before coating the polyvalent metal salt is at least 10 seconds and less than 60 seconds.

The paper sizing degree can be measured according to JIS P-8122.

The basis weight of the recording paper used in the invention has to be from 63 to 100 g/m$^2$, and it is preferably from 70 to 90 g/m$^2$. The higher the basis weight, the more advantageous for reducing curling and cockling. However, when the basis weight exceeds 100 g/m, the paper is hardly used as an office document. When the basis weight is less than 63 g/m$^2$, occurrence of curling and cockling cannot be minimized.

The basis weight can be measured according to JIS P-8124.

The polyvalent metal salt is coated on the surface of the recording paper in the invention. This polyvalent metal salt allows crosslinking of the anionized pigment and the anionic compound in ink used in ink jet recording to cause agglomeration in the pigment and the like in ink very quickly, whereby an excellent printed image quality can be obtained on a plain paper. Further, the permeation of the solvent of ink into the paper is controlled, which is effective for reducing curling and cockling occurring immediately after printing and curling and cockling occurring after allowing to stand and drying.

As the polyvalent metal salt in the invention, oxides, sulfates, nitrates, formates and acetates of polyvalent metals such as sodium, potassium, barium, calcium, magnesium, zinc, tin, manganese and aluminum can be used. Specific examples thereof can include sodium chloride, sodium sulfate, sodium acetate, potassium chloride, potassium nitrate, potassium acetate, barium chloride, calcium chloride, calcium acetate, calcium nitrate, calcium formate, magnesium chloride, magnesium sulfate, magnesium nitrate, magnesium acetate, magnesium formate, zinc chloride, zinc sulfate, zinc nitrate, zinc formate, tin chloride, tin nitrate, manganese chloride, manganese sulfate, manganese nitrate, manganese formate, aluminum sulfate, aluminum nitrate, aluminum chloride and aluminum acetate.

These may be used either singly or in combination. Of these polyvalent metal salts, metal salts having a high solubility in water and a high valence are preferable. When a counter ion of the polyvalent metal salt is a strong acid, paper yellowing occurs after coating. For this reason, among the foregoing polyvalent metal salts, calcium salts such as calcium acetate, calcium chloride and calcium formate, magnesium salts such as magnesium acetate, magnesium chloride and magnesium formate and aluminum salts such as aluminum chloride and aluminum acetate are more preferable.

When coating the polyvalent metal salt, a coating solution obtained by dissolving the same in water may directly be coated on the surface of the recording paper. However, it is preferably used by being mixed with a binder. Examples of the binder include oxidized starch, phosphoric acid-esterified starch, home-made modified starch, cationized starch, various modified starches, polyethylene oxide, polyacrylamide, sodium polyacrylate, sodium alginate, hydroxymethylcellulose, carboxymethylcellulose, methylcellulose, polyvinyl alcohol and derivatives thereof. These can be used either singly or in combination. However, they are not critical.

The sizing degree of the recording paper can also be adjusted to an appropriate value with the foregoing binder alone. However, when the adjustment of the sizing degree is insufficient with the binder alone, a surface sizing agent may further be used. As the surface sizing agent, a rosin sizing agent, a synthetic sizing agent, a petroleum resin sizing agent, a neutral sizing agent, starch and polyvinyl alcohol can be used. When it is required to reduce a halogen content of the recording paper, it is advisable to use a halogen-free internal sizing agent or surface sizing agent. Specifically, a rosin sizing agent, a synthetic sizing agent, a petroleum resin sizing agent and a neutral sizing agent can be used. In view of improving a shelf stability of the recording paper, it is preferable to use a neutral sizing agent. The sizing degree is adjusted by an amount of the sizing agent. It is preferably from 10 to 60 seconds in terms of a Stöckigt sizing degree.

The polyvalent metal salt is coated on the surface of the base paper with a solution containing the polyvalent metal salt, the binder and the like by an ordinary coating unit such as a size press, a shim size, a gate roll, a roll coater, a bar coater, an air knife coater, a rod blade coater or a blade coater. Then, a drying step is conducted to be able to obtain the recording paper of the invention.

A coating amount of the polyvalent metal salt coated on the surface of the base paper has to be from 0.1 to 3 $g/m^2$. When the coating amount is less than 0.1 $g/m^2$, a reaction with the pigment or the anionic polymer to be described later in ink is weakened, which results in decreasing an image quality and increasing curling and cockling immediately after printing and curling and cockling after allowing to stand and drying. When the coating amount exceeds 3 $g/m^2$, a permeability of ink is worsened, which causes deficient drying in high-speed printing.

The coating amount of the polyvalent metal salt is preferably from 0.2 to 2.0 $g/m^2$, more preferably from 0.5 to 2.0 $g/m^2$.

With respect to a method of controlling permeation of the coating solution into the base paper in the coating step, it is preferable that the base paper before coating is calendered to adjust the air permeability of the base paper to from 10 to 30 seconds. This is because the permeation of the coating solution into the paper can be controlled by increasing the air permeability of the base paper. However, when the air permeability of the base paper is excessively increased, the permeability of ink in printing of the ink jet recording is also hindered to worsen inter-color bleeding or a drying property.

Increasing a viscosity by the combined use of starch, polyvinyl alcohol and derivatives thereof as the binder of the coating solution is also effective for reducing permeation of the coating solution into the base paper.

There is also a method in which a base paper dried after paper-making without conducting a size press coating step is separately subjected to the size press coating step to reduce permeation of the coating solution into the base paper.

In the recording paper used in the invention, the internal bond strength has to be from 0.05 to 0.2 N·m. When the internal bond strength is less than 0.05 N·m, the strength as a paper becomes weak which is undesirable in handling. When the internal bond strength exceeds 0.2 N·m, the expansion/shrinkage transmission between fibers of the recording paper is increased to increase curling and cockling immediately after printing and curling and cockling after allowing to stand and drying.

The internal bond strength is measured with Internal Bond Tester manufactured by Kumagaya Riki Kogyo according to a method prescribed in JAPAN TAPPI No. 18-2.

With respect to a method of adjusting the internal bond strength, for example, it is considered that a contact point between fibers is reduced for decreasing the internal bond strength. Such an adjustment can be conducted according to a beating degree of a pulp, a type of a pulp, a type and an amount of a filler in a paper, a type and an amount of a sizing agent, a type and an amount of a binder, a wet press pressure and a drying condition.

The ink used in the invention is described below.

The ink used in the invention contains at least a pigment, a water-soluble organic solvent, water and a surfactant. It further contains a pigment dispersing agent, an anionic compound and various additives.

These components are described below.

<Components Contained in Ink>

Pigment

The pigment used in ink of the invention may be either an organic pigment or an inorganic pigment. With respect to the color of the pigment, a black pigment, pigments of three primary colors, cyan, magenta and yellow, pigments of specific colors, red, green, blue, brown and white, metallic luster pigments of gold and silver colors, monochromic or light-color extender pigments, and plastic pigments are available. Pigments newly formed for the invention are also available.

Examples of the black pigment include carbon black pigments such as furnace black, lamp black, acetylene black and channel black. Specific examples thereof include Raven 7000, Raven 5750, Raven 5250, Raven 5000 ULTRA II, Raven 3500, Raven 2000, Raven 1500, Raven 1250, Raven 1200, Raven 1190 ULTRA II, Raven 1170, Raven 1255, Raven 1080, Raven 1060 (made by Colombian D Carbon), Regal400R, Regal 330R, Regal 660R, Mogul L, Black Pearls L, Monarch 700, Monarch 800, Monarch 880, Monarch 900, Monarch 1000, Monarch 1100, Monarch 1300, Monarch 1400 (made by Cabot), Color Black FW1, Color Black FW2, Color Black FW2V, Color Black 18, Color Black FW200, Color Black S150, Color Black S160, Color Black S170, Pritex 35, Britex U, Pritex Vrintex 140U, Printex 140V, Special Black 6, Special Black 5, Special Black 4A, Special Black 4 (made by Degussa), No. 25, No. 33, No. 40, No. 47, No. 52, No. 900, No. 2300, MCF-88, MA600, MA7, MA8 and MA100 (made by Mitsubishi Chemical Corp.).

It is hard to equally discuss a preferable structure of carbon black pigments. It is however preferable that a particle size is from 15 to 30 nm, a BET specific surface area from 70 to 300 $m^2/g$, a DBP oil absorption from $0.5\times10^{-3}$ to $1.0\times10^{-3}$ L/g, a volatile content from 0.5 to 10% by weight and an ash content from 0.01 to 1.00% by weight respectively. The use of carbon black pigments deviating from these ranges might increase the particle size of dispersed particles in ink.

Specific examples of the cyan pigment include C.I. Pigment Blue-1, C.I. Pigment Blue-2, C.I. Pigment Blue-3, C.I. Pigment Blue-15, C.I. Pigment Blue-15:1, C.I. Pigment Blue-15:3, C.I. Pigment Blue-15:34, C.I. Pigment Blue-16, C.I. Pigment Blue-22 and C.I. Pigment Blue-60.

Specific examples of the magenta pigment include C.I. Pigment Red 5, C.I. Pigment Red 7, C.I. Pigment Red 12, C.I. Pigment Red 48, C.I. Pigment Red 48:1, C.I. Pigment Red 57, C.I. Pigment Red 112, C.I. Pigment Red 122, C.I. Pigment Red 123, C.I. Pigment Red 146, C.I. Pigment Red 168, C.I. Pigment Red 184 and C.I. Pigment Red 202.

Specific examples of the yellow pigment include C.I. Pigment Yellow-1, C.I. Pigment Yellow-2, C.I. Pigment Yellow-3, C.I. Pigment Yellow-12, C.I. Pigment Yellow-13, C.I. Pigment Yellow-14, C.I. Pigment Yellow-16, C.I. Pigment Yellow-17, C.I. Pigment Yellow-73, C.I. Pigment Yellow-74, C.I. Pigment Yellow-75, C.I. Pigment Yellow-83, C.I. Pigment Yellow-93, C.I. Pigment Yellow-95, C.I. Pigment Yellow-97, C.I. Pigment Yellow-98, C.I. Pigment Yellow-114, C.I. Pigment Yellow- 128, C.I. Pigment Yellow-129, C.I. Pigment Yellow-151 and C.I. Pigment Yellow-154.

The pigment which can be used in the invention may be a pigment which is self-dispersible in water. The pigment self-dispersible in water is a pigment having a large number of water-soluble groups on the surface and being stably dispersed even in the absence of a pigment dispersing agent. Specifically, the pigment self-dispersible in water can be obtained by subjecting an ordinary pigment to surface modification treatment such as acid-base treatment, coupling agent treatment, polymer graft treatment, plasma treatment or oxidation/reduction treatment. In addition to the thus-surface-modified pigments, commercially available pigments such as Cab-o-jet-200, Cab-o-jet-300, IJX-55, IJX-253, IJX-266 and IJX-273 made by Cabot, Nicrojet Black CW-1 made by Orient Kagaku and pigments sold by Nippon Shokubai may be used as the pigment self-dispersible in water.

The water-soluble group present on the surface of the pigment self-dispersible in water may be a nonionic, cationic or anionic group. Especially, sulfonic acid, carboxylic acid, hydroxyl and phosphoric acid are preferable. Sulfonic acid, carboxylic acid and phosphoric acid may be used as such in the form of a free acid. For increasing a water solubility, it is preferable to use this group in the form of a salt with a basic compound.

In this case, basic compounds of alkali metals such as sodium, potassium and lithium, aliphatic amines such as monomethylamine, dimethylamine and triethylamine, alcohol amines such as monomethanolamine, monoethanolamine, diethanolamine, triethanolamine and diisopropanolamine, and ammonia can be used. Of these, basic compounds of alkali metals such as sodium, potassium and lithium can be used especially preferably. This is because the basic compounds of the alkali metals are strong electrolytes having a great effect for expediting dissociation of an acid group.

The content of the pigment in ink is from 0.5 to 20% by weight, preferably from 2 to 10% by weight. When the content of the pigment is less than 0.5% by weight, an optical density of an image might be decreased. When the content of the pigment exceeds 20% by weight, a fixability of an image might be worsened.

Water-soluble Organic Solvent

Examples of the water-soluble organic solvent used in ink of the invention include polyhydric alcohols such as ethylene glycol, diethylene glycol, propylene glycol, butylene glycol, triethylene glycol, 1,5-pentanediol, 1,2,6-hexanetriol and glycerin, polyhydric alcohol derivatives such as ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, propylene glycol monobutyl ether and dipropylene glycol monobutyl ether, nitrogen-containing solvents such as pyrrolidone, N-methyl-2-pyrrolidone, cyclohexyl pyrrolidone and triethanolamine, alcohols such as ethanol, isopropyl alcohol, butyl alcohol and benzyl alcohol, sulfur-containing solvents such as thiodiethanol, thiodiglycerol, sulfolane and dimethyl sulfoxide, propylene carbonate, and ethylene carbonate. These water-soluble organic solvents may be used either singly or in combination.

The content of the water-soluble organic solvent in ink is preferably from 1 to 60% by weight, more preferably from 5 to 40% by weight. When the content of the water-soluble organic solvent is less than 1% by weight, a long-term shelf stability might be decreased. When the content exceeds 60% by weight, the jet stability of ink might be decreased to prevent normal jetting.

Water

As water used in ink of the invention, deionized water, distilled water, pure water and ultrapure water can be used.

The content of water in ink is preferably from 15 to 98% by weight, more preferably from 45 to 90% by weight. When it is less than 15% by weight, the jet stability of ink might be decreased to prevent normal jetting. When it exceeds 98% by weight, the long-term storage stability of ink might be decreased.

Surfactant

The surfactant used in ink of the invention is added for adjusting a surface tension or a wettability of the pigment dispersing agent and ink and for solubilizing organic impurities in ink to improve a jet reliability. Regarding the type of the surfactant, nonionic and anionic surfactants that less influence the dispersed state of the water-insoluble colorant or the dissolved state of the water-soluble dye are preferable.

Examples of the nonionic surfactant can include polyoxyethylene nonylphenyl ether, polyoxyethylene octylphenyl ether, polyoxyethylene dodecylphenyl ether, polyoxyethylene alkyl ether, polyoxyethylene fatty acid ester, sorbitan fatty acid ester, polyoxyethylenesorbitan fatty acid ester, fatty acid alkylolamide, acetylene alcohol ethylene oxide adduct, polyethylene glycol polypropylene glycol block copolymer, glycerin ester polyoxyethylene ether, and sorbitol ester polyoxyethylene ether. Examples of the anionic surfactant can include alkylbenzene sulfonate, alkylphenyl sulfonate, alkylnaphthalene sulfonate, higher fatty acid salt, and sulfate, sulfonate and higher alkylsulfosuccate of higher fatty acid ester. Examples of the ampholytic surfactant can include betaine, sulfobetaine, sulfate betaine and imidazoline. In addition, silicone surfactants such as polysiloxane polyoxyethylene adduct, fluorine-containing surfactants such as oxyethylene perfluoroalkyl ether, and biosurfactants such as spiculisporic acid, rhamnolipid and lysolecithin are also available. These surfactants used in ink may be used either singly or in combination.

A surface tension of ink used in the invention as will be described later can be mainly adjusted according to the type and the amount of the surfactant, and the amount can be adjusted by desired properties such as a surface tension.

Pigment Dispersing Agent

In the ink of the invention, besides the pigment, the water-soluble solvent, water and the surfactant, a pigment dispersing agent can preferably be used to improve a dispersibility of the pigment. Specific examples of the pigment dispersing agent include a polymeric dispersing agent, an anionic surfactant, a cationic surfactant, an ampholytic surfactant and a nonionic surfactant. Of these, a pigment dispersing agent that becomes an organic anion when ionized in water is expressed as the anionic pigment dispersing agent in the invention. The anionic pigment dispersing agent can also be used as an anionic compound in ink as will be described later.

As the polymeric dispersing agent, a polymer having a hydrophilic structural moiety and a hydrophobic structural moiety can effectively be used. Examples of the polymer having the hydrophilic structural moiety and the hydrophobic structural moiety include a condensation polymer and an addition polymer. As the condensation polymer, a known polyester dispersing agent is available. As the addition polymer, an addition polymer of a monomer having an $\alpha,\beta$-ethylenically unsaturated group is available. This polymer can be obtained as a desired polymeric dispersing agent by copolymerizing a monomer having an $\alpha,\beta$-ethylenically unsaturated group with a hydrophilic group and a monomer having an α,β-ethylenically unsaturated group with a hydrophobic group in proper combination. A homopolymer of a monomer having an α,β-ethylenically unsaturated group with a hydrophilic group can also be used.

Examples of the monomer having an α,β-ethylenically unsaturated group with a hydrophilic group include monomers having a carboxyl group, a sulfonic acid group, a hydroxyl group and a phosphoric acid group, such as acrylic acid, methacrylic acid, crotonic acid, itaconic acid, itaconic acid monoester, maleic acid, maleic acid monoester, fumaric acid, fumaric acid monoester, vinylsulfonic acid, styrenesulfonic acid, vinylnaphthalene sulfonate, vinyl alcohol, acrylamide, methacryloxyethyl phosphate, bismethacryloxyethyl phosphate, methacryloxyethylphenyl acidophosphate, ethylene glycol dimethacrylate, and diethylene glycol dimethacrylate.

Meanwhile, examples of the monomer having an α,β-ethylenically unsaturated group with a hydrophobic group include styrene, styrene derivatives such as α-methylstyrene and vinyltoluene, vinylcyclohexane, vinylnaphthalene, vinylnaphthalene derivatives, acrylic acid alkyl ester, acrylic acid phenyl ester, methacrylic acid alkyl ester, methacrylic acid phenyl ester, methacrylic acid cycloalkyl ester, crotonic acid alkyl ester, itaconic acid dialkyl ester, and maleic acid dialkyl ester.

Preferable examples of the copolymer of these monomers include styrene-styrenesulfonic acid copolymer, styrene-maleic acid copolymer, styrene-methacrylic acid copolymer, styrene-acrylic acid copolymer, vinylnaphthalene-maleic acid copolymer, vinylnaphthalene-methacrylic acid copolymer, vinylnaphthalene-acrylic acid copolymer, acrylic acid alkyl ester-acrylic acid copolymer, methacrylic acid alkyl ester-methacrylic acid copolymer, styrene-methacrylic acid alkyl ester-methacrylic acid copolymer, styrene-acrylic acid alkyl ester-acrylic acid copolymer, styrene-methacrylic acid phenyl ester-methacrylic acid copolymer, and styrene-methacrylic acid cyclohexyl ester-methacrylic acid copolymer.

These polymers can further be copolymerized with a monomer having a polyoxyethylene group or a hydroxyl group as required. Moreover, for enhancing an affinity for a pigment having an acid functional group on the surface to increase a dispersion stability, it is also possible to copolymerize, as required, a monomer having a cationic functional group as required. Examples of the monomer include N,N-dimethylaminoethyl methacrylate, N,N-dimethylaminoethyl acrylate, N,N-dimethylaminomethacrylamide, N,N-dimethylaminoacrylamide, N-vinylpirole, N-vinylpyridine, N-vinylpyrrolidone, and N-vinylimidazole.

These copolymers may be random, block and graft copolymers. Further, polystyrenesulfonic acid, polyacrylic acid, polymethacrylic acid, polyvinylsulfonic acid, polyalginic acid, polyoxyethylene-polyoxypropylene-polyoxyethylene block copolymer, naphthalenesulfonic acid formalin condensate, polyvinyl pyrrolidone, polyethyleneimine, polyamines, polyamides, polyvinylimidazoline, aminoalkyl acrylate-D-acrylamide copolymer, chitosan, polyoxyethylene fatty acid amide, polyvinyl alcohol, polyacrylamide, cellulose derivatives such as carboxymethylcellulose and carboxyethylcellulose, polysaccharides, and derivatives thereof are also available.

The hydrophilic group of the pigment dispersing agent is preferably carboxylic acid or carboxylic acid salt, which is not critical, though. This is presumably because the carboxyl group forms a crosslinked structure with the polyvalent metal ion from the polyvalent metal salt coated on the surface of the recording paper and the pigment thereby comes to have an appropriate agglomeration structure.

In the pigment dispersing agent, at least 50%, preferably at least 80% of the acid group in the copolymer based on the acid value of the copolymer is neutralized. The molecular weight of the pigment dispersing agent is preferably from 2,000 to 15,000, more preferably from 3,500 to 10,000 in terms of a weight average molecular weight. The structure and the composition ratio of the hydrophobic structural moiety and the hydrophilic structural moiety are determined according to the combination of the pigment and the solvent.

These pigment dispersing agents may be used either singly or in combination. The amount of the pigment dispersing agent varies greatly with the pigment, and cannot absolutely be determined. It is preferably from 0.1 to 100% by weight, more preferably from 1 to 70% by weight, further preferably from 3 to 50% by weight based on the pigment.

Anionic Compound

The ink jet recording method of the invention is characterized in that the pigment in ink is agglomerated on the surface of the recording paper with the polyvalent metal salt. In order to expedite the agglomeration, the anionic compound is further used advantageously in ink of the invention. Examples of the anionic compound include acids such as carboxylic acid and sulfonic acid, derivatives thereof, and an anionic polymer emulsion. The foregoing anionic pigment dispersing agent may be used.

Specific examples of the carboxylic acid include carboxylic acids such as formic acid, acetic acid, propionic acid, butyric acid, valeric acid, lactic acid, tartaric acid, benzoic acid, acrylic acid, crotonic acid, butenic acid, methacrylic acid, tiglic acid, allylic acid, 2-ethyl-2-butenic acid, oxalic acid, malonic acid, succinic acid, glutaric acid, maleic acid, fumaric acid, methylmaleic acid and glyceric acid, and polymers and derivatives thereof. Further, alkali metal salts, alkaline earth metal salts and ammonium salts of these compounds are also available.

Specific examples of the sulfonic acid include sulfonic acids such as benzenesulfonic acid, toluenesulfonic acid, xylenesulfonic acid, benzenedisulfonic acid, benzenetrisulfonic acid, hydroxybenzenesulfonic acid, chlorobenzenesulfonic acid, bromobenzenesulfonic acid, 4-hydroxy-1,3-benzenedisulfonic acid, 4,5-dihydroxybenzene-1,3-disulfonic acid sodium and o-aminobenzenesulfonic acid, derivatives thereof, and alkali metal salts, alkaline earth metal salts and ammonium salts thereof.

The anionic compound preferably contains a carboxyl group, which is not critical, though. This is presumably because the carboxyl group, as noted above, forms a crosslinked structure with the polyvalent metal ion from the polyvalent metal salt coated on the surface of the recording paper and the pigment thereby comes to have an appropriate agglomeration structure.

These compounds are preferably used in the form of salts with basic compounds for increasing a water solubility. With respect to the compounds that form salts with these compounds, it is possible to use alkali metals such as sodium, potassium and lithium, aliphatic amines such as monomethylamine, dimethylamine and triethylamine, alcohol amines such as monomethanolamine, monoethanolamine, diethanolamine, triethanolamine and diisopropanolamine, and ammonia. Of these, basic compounds of alkali metals such as sodium, potassium and lithium are preferably used. This is because the basic compounds of alkali metals are strong electrolytes and greatly effective for expediting dissociation of an acid group.

More preferable examples of the anionic compound include acrylic acid alkyl ester-acrylic acid copolymer, styrene-methacrylic acid alkyl ester-methacrylic acid copolymer, styrene-maleic acid copolymer, styrene-methacrylic acid copolymer, styrene-acrylic acid copolymer, methacrylic acid alkyl ester-methacrylic acid copolymer, styrene-acrylic acid alkyl ester-acrylic acid copolymer, styrene-methacrylic acid phenyl ester-methacrylic acid copolymer, styrene-methacrylic acid cyclohexyl ester-methacrylic acid copolymer, and salts and derivatives of these copolymers.

It is preferable that the anionic compound contained in ink has a structure having a hydrophilic moiety and a hydrophobic moiety, and that carboxylic acid or carboxylic acid salt is contained as a hydrophilic functional group. This is presumably because the carboxyl group forms a crosslinked structure with the polyvalent metal ion from the polyvalent metal salt coated on the surface of the recording paper and the pigment thereby comes to have an appropriate agglomeration structure.

Specifically, it is preferable that a monomer constituting the hydrophilic moiety in the anionic compound is at least one selected from acrylic acid, methacrylic acid, maleic acid and maleic anhydride. Meanwhile, it is preferable that a monomer constituting the hydrophobic moiety in the anionic compound is at least one selected from styrene, styrene derivatives such as α-methylstyrene and vinyltoluene, vinylcyclohexane, vinylnaphthalene, vinylnaphthalene derivatives, acrylic acid alkyl ester, methacrylic acid alkyl ester, methacrylic acid phenyl ester, methacrylic acid cycloalkyl ester, crotonic acid alkyl ester, itaconic acid dialkyl ester, and maleic acid dialkyl ester. Of these, at least one selected from styrene and alkyl, aryl and alkylaryl esters of acrylic acid and methacrylic acid is preferable.

These anionic compounds may be used either singly or in combination. The content of the anionic compound in ink is preferably from 0.1 to 10% by weight, more preferably from 0.3 to 5% by weight. When it is less than 0.1% by weight, a long-term storage stability of ink might be decreased, or an optical density of an image might be decreased. When the content exceeds 10% by weight, ink might not normally be jetted, or an optical density of an image might be decreased.

Other Additives

Ink used in the invention can further contain, as required, a pH buffer, an antioxidant, a mildewproofing agent, a viscosity modifier, a conductive agent, an ultraviolet absorber, a chelating agent, a water-soluble dye, a disperse dye, and an oil-soluble dye. The amounts of these additives in ink are preferably 20% by weight or less.

<Process for Producing Ink>

Ink of the invention can be obtained by, for example, adding a predetermined amount of the pigment to an aqueous solution containing a predetermined amount of the pigment dispersing agent, thoroughly stirring the mixture, dispersing the resulting mixture with a disperser, removing coarse particles through centrifugation, then adding the predetermined water-soluble solvent and the additives, mixing them with stirring and then conducting filtration. At this time, a method in which a concentrated dispersion of the pigment is previously prepared and diluted in production of ink can also be used. Further, a step of pulverizing the pigment may be conducted before the dispersing step. Alternatively, it is also possible to mix a predetermined water-soluble organic solvent, water and a pigment dispersing agent, then add a pigment thereto and disperse the mixture with a disperser.

As the disperser, commercially available devices can be used. Examples thereof include a colloid mill, a flow jet mill, a slasher mill, a high-speed disperser, a ball mill, an attritor, a sand mill, a sand grinder, an ultrafine mill, an eiger motor mill, a dyno mill, a pearl mill, an agitator mill, a cobol mill, a three-roll mill, a two-roll mill, an extruder, a kneader, a microfluidizer, a laboratory homogenizer and an ultrasonic homogenizer. These may be used either singly or in combination. In order to prevent incorporation of inorganic impurities, it is advisable to use a dispersing method in the absence of a dispersion medium. In this case, it is advisable to use a microfluidizer or an ultrasonic homogenizer. In Examples of the invention, the dispersion is conducted with an ultrasonic homogenizer.

Meanwhile, ink using a pigment self-dispersible in water can be obtained by, for example, surface-modifying a pigment, adding the resulting pigment to water, fully mixing them, subjecting the solution, as required, to the foregoing dispersion with the disperser, removing coarse particles through centrifugation, then adding a predetermined solvent and predetermined additives, mixing them with stirring and filtering the reaction mixture.

The pH of the foregoing ink is preferably from 3 to 11, more preferably from 4.5 to 9.5. The pH of ink containing a pigment having an anionic free group on the surface is preferably from 6 to 11, more preferably from 6 to 9.5, further preferably from 7.5 to 9.0. The pH of ink containing a pigment having a cationic free group on the surface is preferably from 4.5 to 8.0, more preferably from 4.5 to 7.0.

The viscosity of ink used in the invention is preferably from 1.5 to 5.0 mPa·s, more preferably from 1.5 to 4.0 mPa·s. When the viscosity of ink is more than 5.0 mP·s, the permeability into the recording paper is decreased. Accordingly, color mixture blotting tends to occur, making it impossible to obtain a good image quality and a satisfactory image fixability. Meanwhile, when the viscosity of ink is less than 1.5 mPa·s, the permeability into the recording paper is increased too much, and the pigment and the anionic compound in ink cannot be agglomerated. As a result, ink is permeated into the recording paper to decrease a density, cause blotting of characters and increase curling and cockling.

The viscosity of ink is measured at a measurement temperature of 23° C. and a shear rate of 1,400 s$^{-1}$ using a rotary viscometer Leomat 115 (manufactured by Contraves).

The number average particle size of the dispersed particles in ink is preferably from 15 to 100 nm, more preferably from 15 to 80 nm, further preferably from 20 to 70 nm. The volume average particle size of the dispersed particles in ink is preferably from 30 to 200 nm, more preferably from 30 to 170 nm, further preferably from 30 to 150 nm. The number average particle size and the volume average particle size of the dispersed particles in ink are substantially those of the pigment in ink.

When the number average particle size and the volume average particle size of the dispersed particles in ink are within the foregoing ranges, an optical density of an image is high, and an image fixability is excellent. When the number average particle size of the dispersed particles in ink is larger than 100 nm or the volume average particle size thereof is more than 200 nm, an optical density of an image might be decreased. It is considered that as the particle size of the dispersed particles is increased, the particle size of the pigment agglomerate is also increased and no satisfactory optical density of an image is obtained. It is generally known that a pigment having a large primary particle size has a low coloring power. On the other hand, when the number average particle size of the dispersed particles in ink is less than 15 nm or the volume average particle size thereof is less than 30 nm, the viscosity of ink might be increased to cause clogging of a nozzle.

In the invention, Microtrack UPA Particle Size Analyzer 9340 (manufactured by Leeds & Northrup) is used as a device for measuring the number average particle size and the volume average particle size. In this device, a particle size is measured using a Brownian movement of a dispersoid. Ink with particles dispersed therein is irradiated with a laser beam, and the scattered light thereof is detected to measure the particle size. The measurement is conducted according to a predetermined measurement method upon charging 4 ml of ink into a measuring cell. As parameters inputted in the measurement, the viscosity of ink is inputted as a viscosity and the density of the pigment as a density of the dispersed particles respectively.

The surface tension of ink in the invention is mainly adjusted according to the amount of the surfactant, and it has to be from 25 to 37 mN/m. When the surface tension is less than 25 mN/m, permeation of ink into the recording paper proceeds to increase curling and cockling. When the surface tension is more than 37 mN/m, the permeability of ink into the recording paper is lowered to decrease a drying property, which is disadvantageous to meet the high-speed printing.

The surface tension of ink is preferably from 25 to 35 mN/m, more preferably from 28 to 35 mN/m.

The surface tension of ink is measured in an atmosphere of 23° C. and 55% RH using a Withelmy's surface balance.

The ink jet recording method of the invention is advantageously used for ink jet recording which allows high-speed printing with ink having a relatively low surface tension as noted above. That is, in case of ordinary monochromic (black) printing or low-speed printing, it is possible to secure an image quality and reduce curling by the method in which the polyvalent metal salt is coated on the surface of the recording paper or the internal bond strength of the recording paper is weakened as described above. However, especially the color printing or the high-speed printing with a high image quality cannot be coped with by the foregoing method. The combination of the recording paper and ink in the invention has made it possible, for the first time, to eliminate inter-color bleeding and character feathering and to reduce curling and cockling. Moreover, in double-sided printing, it is also possible to obtain a good image and reduce curling and cockling.

Accordingly, the ink jet recording method of the invention is used preferably in an ink jet recording apparatus with a scanning ink head in which a head scanning speed, as a printing speed, in a single-sided batch printing mode is from 25 to 127 cm/sec, more preferably in an ink jet recording apparatus in which a head scanning speed is from 25 to 114 cm/sec. Further, it is used preferably in an ink jet recording apparatus with a stationary ink head in which a paper feed rate is from 6 to 50 cm/sec, more preferably in an ink jet recording apparatus in which a paper feed rate is from 6 to 42 cm/sec.

EXAMPLES

The invention is illustrated specifically below by referring to Examples. However, the invention is not limited to these Examples.

First, inks used in Examples and Comparatives Examples in the invention are described below.

<Ink Set 1>

As will be described below, a pigment, a water-soluble organic solvent, a surfactant, water, an anionic compound are mixed and stirred such that the total amount thereof is 100 parts by weight and the concentration of the pigment is 4% by weight, and the mixture is passed through a 1 μm filter to obtain inks of four colors.

Black Ink surface-treated pigment (Cab-o-jet-300, made by Cabot) 4 parts by weight diethylene glycol 20 parts by weight surfactant (Surfynol 465, made by Nissin Chemical Industry) 4 parts by weight urea 5 parts by weight deionized water 67 parts by weight This black ink has a surface tension of 26 mN/m and a viscosity of 2.8 mPa·s.

Cyan Ink surface-treated pigment (IJX-253, made by Cabot) 4 parts by weight diethylene glycol 20 parts by weight surfactant (Surfynol 465, made by Nissin Chemical Industry) 4 parts by weight urea 5 parts by weight deionized water 67 parts by weight This cyan ink has a surface tension of 26 mN/m and a viscosity of 2.6 mPa·s.

Magenta Ink surface-treated pigment (IJX-266, made by Cabot) 4 parts by weight diethylene glycol 20 parts by weight surfactant (Surfynol 465, made by Nissin Chemical Industry) 4 parts by weight urea 5 parts by weight deionized water 67 parts by weight This magenta ink has a surface tension of 26 mN/m and a viscosity of 2.7 mPa·s.

Yellow Ink surface-treated pigment (IJX-273, made by Cabot) 4 parts by weight diethylene glycol 20 parts by weight surfactant (Surfynol 465, made by Nissin Chemical Industry) 4 parts by weight urea 5 parts by weight deionized water 67 parts by weight This yellow ink has a surface tension of 26 mN/m and a viscosity of 2.8 mPa·s.

<Ink set 2>

The following inks of four colors are obtained in the same manner as in ink set 1.

Black Ink surface-treated pigment (Cab-o-jet-300, made by Cabot) 4 parts by weight diethylene glycol 20 parts by weight surfactant (Surfynol 465, made by Nissin Chemical Industry) 0.5 part by weight urea 5 parts by weight deionized water 70.5 parts by weight This black ink has a surface tension of 32 mN/m and a viscosity of 2.8 mPa·s.

Cyan Ink surface-treated pigment (IJX-253, made by Cabot) 4 parts by weight diethylene glycol 20 parts by weight surfactant (Surfynol 465, made by Nissin Chemical Industry) 0.5 part by weight urea 5 parts by weight deionized water 70.5 parts by weight This cyan ink has a surface tension of 32 mN/m and a viscosity of 2.5 mPa·s.

Magenta Ink surface-treated pigment (IJX-266, made by Cabot) 4 parts by weight diethylene glycol 20 parts by weight surfactant (Surfynol 465, made by Nissin Chemical Industry) 0.5 part by weight urea 5 parts by weight deionized water 70.5 parts by weight This magenta ink has a surface tension of 33 mN/m and a viscosity of 2.7 mPa·s.

Yellow Ink surface-treated pigment (IJX-273, made by Cabot) 4 parts by weight diethylene glycol 20 parts by weight surfactant (Surfynol 465, made by Nissin Chemical Industry) 0.5 part by weight urea 5 parts by weight deionized water 70.5 parts by weight This yellow ink has a surface tension of 33 mN/m and a viscosity of 2.7 mPa·s.

<Ink Set 3>

The following inks of four colors are obtained in the same manner as in ink set 1.

Black Ink surface-treated pigment (Cab-o-jet-300, made by Cabot) 4 parts by weight styrene-maleic acid-sodium maleate copolymer 0.5 part by weight diethylene glycol 20 parts by weight surfactant (Surfynol 465, made by Nissin Chemical Industry) 0.5 part by weight urea 5 parts by weight deionized water 70 parts by weight This black ink has a surface tension of 32 mN/m and a viscosity of 2.8 mPa·s.

Cyan Ink surface-treated pigment (IJX-253, made by Cabot) 4 parts by weight styrene-maleic acid-sodium maleate copolymer 0.5 part by weight diethylene glycol 20 parts by weight surfactant (Surfynol 465, made by Nissin Chemical Industry) 0.5 part by weight urea 5 parts by weight deionized water 70 parts by weight This cyan ink has a surface tension of 32 mN/m and a viscosity of 2.5 mPa·s.

Magenta Ink surface-treated pigment (IJX-266, made by Cabot) 4 parts by weight styrene-maleic acid-sodium maleate copolymer 0.5 part by weight diethylene glycol 20 parts by weight surfactant (Surfynol 465, made by Nissin Chemical Industry) 0.5 part by weight urea 5 parts by weight deionized water 70 parts by weight This magenta ink has a surface tension of 33 mN/m and a viscosity of 2.7 mPa·s.

Yellow Ink surface-treated pigment (IJX-273, made by Cabot) 4 parts by weight styrene-maleic acid-sodium maleate copolymer 0.5 part by weight diethylene glycol 20 parts by weight surfactant (Surfynol 465, made by Nissin Chemical Industry) 0.5 part by weight urea 5 parts by weight deionized water 70 parts by weight This yellow ink has a surface tension of 33 mN/m and a viscosity of 2.7 mPa·s.

<Ink Set 4>

The following inks of four colors are obtained in the same manner as in ink set 1.

Black Ink surface-treated pigment (Cab-o-jet-300, made by Cabot) 4 parts by weight diethylene glycol 20 parts by weight surfactant (BL-2, made by Nikko Chemical) 0.7 part by weight urea 5 parts by weight deionized water 70.3 parts by weight This black ink has a surface tension of 22 mN/m and a viscosity of 2.8 mPa·s.

Cyan Ink surface-treated pigment (IJX-253, made by Cabot) 4 parts by weight diethylene glycol 20 parts by weight surfactant (BL-2, made by Nikko Chemical) 0.7 part by weight urea 5 parts by weight deionized water 70.3 parts by weight This cyan ink has a surface tension of 22 mN/m and a viscosity of 2.5 mPa·s.

Magenta Ink surface-treated pigment (IJX-266, made by Cabot) 4 part by weight diethylene glycol 20 parts by weight surfactant (BL-2, made by Nikko Chemical) 0.7 part by weight urea 5 parts by weight deionized water 70.3 parts by weight This magenta ink has a surface tension of 22 mN/m and a viscosity of 2.7 mPa·s.

Yellow Ink surface-treated pigment (IJX-273, made by Cabot) 4 parts by weight diethylene glycol 20 parts by weight
surfactant (BL-2, made by Nikko Chemical) 0.7 part by weight
urea 5 parts by weight
deionized water 70.3 parts by weight This yellow ink has a surface tension of 22 mN/m and a viscosity of 2.7 mPa·s.

Recording papers used in Examples and Comparative Examples in the invention are described below.

<Recording Paper 1>

A pulp (100 parts by weight) containing a hard wood craft pulp of which the freeness is adjusted to 480 ml by beating and a dry pulp made of a hard wood craft pulp at a weight ratio of 70 to 30 is mixed with 15 parts by weight of precipitated calcium carbonate as a filler, 8 parts by weight of kaolin and 0.1 part by weight of alkylketene dimer (AKD) as an internal sizing agent, and the mixture is subjected to paper-making. Further, a coating solution containing 99 parts by weight of water and 1 part by weight of cationized starch (Ace K, made by Oji Corn Starch K.K.) is prepared to conduct size press coating. The product is calendered for smoothing to obtain a recording paper having a basis weight of 100 g/m². Coating of a polyvalent metal salt is not conducted, and an internal bond strength is 0.05 N·m.

<Recording Paper 2>

A pulp (100 parts by weight) containing a hard wood craft pulp of which the freeness is adjusted to 480 ml by beating and a dry pulp made of a hard wood craft pulp at a weight ratio of 70 to 30 is mixed with 15 parts by weight of precipitated calcium carbonate as a filler, 8 parts by weight of kaolin and 0.1 part by weight of alkylketene dimer (AKD) as an internal sizing agent, and the mixture is subjected to paper-making. Further, a coating solution containing 94 parts by weight of water, 1 part by weight of cationized starch (Ace K, made by Oji Corn Starch K.K.) and 5 parts by weight of calcium chloride is prepared to conduct size press coating. The product is calendered for smoothing to obtain a recording paper in which calcium chloride is coated on both surfaces in a coating amount of 1 g/m² for one surface and a basis weight is 100 g/m². An internal bond strength is 0.05 N·m.

<Recording Paper 3>

A pulp (100 parts by weight) containing a hard wood craft pulp of which the freeness is adjusted to 480 ml by beating and a dry pulp made of a hard wood craft pulp at a weight ratio of 70 to 30 is mixed with 15 parts by weight of precipitated calcium carbonate as a filler, 8 parts by weight of kaolin and 0.1 part by weight of alkylketene dimer (AKD) as an internal sizing agent, and the mixture is subjected to paper-making. Further, a coating solution containing 89 parts by weight of water, 1 part by weight of cationized starch (Ace K, made by Oji Corn Starch K.K.) and 10 parts by weight of calcium chloride is prepared to conduct size press coating. The product is calendered for smoothing to obtain a recording paper in which calcium chloride is coated on both surfaces in a coating amount of 2 g/m² for one surface and a basis weight is 102 g/m². An internal bond strength is 0.05 N·m.

<Recording Paper 4>

A pulp (100 parts by weight) containing a hard wood craft pulp of which the freeness is adjusted to 480 ml by beating and a dry pulp made of a hard wood craft pulp at a weight ratio of 70 to 30 is mixed with 15 parts by weight of precipitated calcium carbonate as a filler, 8 parts by weight of kaolin and 0.1 part by weight of alkylketene dimer (AKD) as an internal sizing agent, and the mixture is subjected to paper-making. Further, a coating solution containing 94 parts by weight of water, 1 part by weight of cationized starch (Ace K, made by Oji Corn Starch K.K.) and 5 parts by weight of calcium chloride is prepared to conduct size press coating. The product is calendered for smoothing to obtain a recording paper in which calcium chloride is coated on both surfaces in a coating amount of 1 g/m² for one surface and a basis weight is 76 g/m². An internal bond strength is 0.06 N·m.

<Recording Paper 5>

A pulp (100 parts by weight) containing a hard wood craft pulp of which the freeness is adjusted to 480 ml by beating and a dry pulp made of a hard wood craft pulp at a weight ratio of 70 to 30 is mixed with 15 parts by weight of precipitated calcium carbonate as a filler, 8 parts by weight of kaolin and 0.1 part by weight of alkylketene dimer (AKD) as an internal sizing agent, and the mixture is subjected to paper-making. Further, a coating solution containing 94 parts by weight of water, 1 part by weight of cationized starch (Ace K, made by Oji Corn Starch K.K.) and 5 parts by weight of calcium chloride is prepared to conduct size press coating. The product is calendered for smoothing to obtain a recording paper in which calcium chloride is coated on both surfaces in a coating amount of 1 g/m² for one surface and a basis weight is 65 g/m². An internal bond strength is 0.06 N·m.

<Recording Paper 6>

A pulp (100 parts by weight) containing a hard wood craft pulp of which the freeness is adjusted to 480 ml by beating and a dry pulp made of a hard wood craft pulp at a weight ratio of 70 to 30 is mixed with 15 parts by weight of precipitated calcium carbonate as a filler, 8 parts by weight of kaolin and 0.1 part by weight of alkylketene dimer (AKD) as an internal sizing agent, and the mixture is subjected to paper-making. Further, a coating solution containing 89 parts by weight of water, 1 part by weight of cationized starch (Ace K, made by Oji Corn Starch K.K.) and 10 parts by weight of calcium chloride is prepared to conduct size press coating. The product is calendered for smoothing to obtain a recording paper in which calcium chloride is coated on both surfaces in a coating amount of 2 g/m² for one surface and a basis weight is 58 g/m². An internal bond strength is 0.06 N·m.

<Recording Paper 7>

A pulp (100 parts by weight) containing a hard wood craft pulp of which the freeness is adjusted to 470 ml by beating and a dry pulp made of a hard wood craft pulp at a weight ratio of 80 to 20 is mixed with 14 parts by weight of precipitated calcium carbonate as a filler, 7 parts by weight of kaolin and 0.1 part by weight of alkylketene dimer (AKD) as an internal sizing agent, and the mixture is subjected to paper-making. Further, a coating solution containing 94 parts by weight of water, 1 part by weight of cationized starch (Ace K, made by Oji Corn Starch K.K.) and 5 parts by weight of calcium chloride is prepared to conduct size press coating. The product is calendered for smoothing to obtain a recording paper in which calcium chloride is coated on both surfaces in a coating amount of 1 g/m² for one surface and a basis weight is 76 g/m². An internal bond strength is 0.11 N·m.

<Recording Paper 8>

A pulp (100 parts by weight) containing a hard wood craft pulp of which the freeness is adjusted to 470 ml by beating and a dry pulp made of a hard wood craft pulp at a weight ratio of 90 to 10 is mixed with 15 parts by weight of precipitated calcium carbonate as a filler and 0.1 part by weight of alkylketene dimer (AKD) as an internal sizing agent, and the mixture is subjected to paper-making. Further, a coating solution containing 94 parts by weight of water, 1 part by weight of cationized starch (Ace K, made by Oji Corn Starch K.K.) and 5 parts by weight of calcium chloride is prepared to conduct size press coating. The product is calendered for smoothing to obtain a recording paper in which calcium chloride is coated on both surfaces in a coating amount of 1 g/m² for one surface and a basis weight is 76 g/m². An internal bond strength is 0.19 N·m.

<Recording Paper 9>

A pulp (100 parts by weight) containing a hard wood craft pulp of which the freeness is adjusted to 470 ml by beating and a dry pulp made of a hard wood craft pulp at a weight ratio of 80 to 20 is mixed with 14 parts by weight of precipitated calcium carbonate as a filler, 7 parts by weight of kaolin and 0.1 part by weight of alkylketene dimer (AKD) as an internal sizing agent, and the mixture is subjected to paper-making. Further, a coating solution containing 94 parts by weight of water, 1 part by weight of cationized starch (Ace K, made by Oji Corn Starch K.K.) and 5 parts by weight of calcium chloride is prepared to conduct size press coating. The product is calendered for smoothing to obtain a recording paper in which calcium chloride is coated on both surfaces in a coating amount of 0.1 g/m² for one surface and a basis weight is 64 g/m². An internal bond strength is 0.10 N·m.

<Recording Paper 10>

A hard wood craft pulp (100 parts by weight) of which the freeness is adjusted to 450 ml by beating is mixed with 10 parts by weight of precipitated calcium carbonate as a filler and 0.1 part by weight of alkylketene dimer (AKD) as an internal sizing agent, and the mixture is subjected to paper-making. Further, a coating solution containing 89 parts by weight of water, 1 part by weight of cationized starch (Ace K, made by Oji Corn Starch K.K.) and 10 parts by weight of calcium chloride is prepared to conduct size press coating. The product is calendered for smoothing to obtain a recording paper in which calcium chloride is coated on both surfaces in a coating amount of 2 g/m² for one surface and a basis weight is 102 g/m². An internal bond strength is 0.29 N·m.

<Recording Paper 11>

A hard wood craft pulp (100 parts by weight) of which the freeness is adjusted to 450 ml by beating is mixed with 10 parts by weight of precipitated calcium carbonate as a filler and 0.1 part by weight of alkylketene dimer (AKD) as an internal sizing agent, and the mixture is subjected to paper-making. Further, a coating solution containing 94 parts by weight of water, 1 part by weight of cationized starch (Ace K, made by Oji Corn Starch K.K.) and 5 parts by weight of calcium chloride is prepared to conduct size press coating. The product is calendered for smoothing to obtain a recording paper in which calcium chloride is coated on both surfaces in a coating amount of 1 g/m² for one surface and a basis weight is 76 g/m². An internal bond strength is 0.30 N·m.

<Recording Paper 12>

A hard wood craft pulp (100 parts by weight) of which the freeness is adjusted to 450 ml by beating is mixed with 10 parts by weight of precipitated calcium carbonate as a filler and 0.1 part by weight of alkylketene dimer (AKD) as an internal sizing agent, and the mixture is subjected to paper-making. Further, a coating solution containing 99 parts by weight of water and 1 part by weight of cationized starch (Ace K, made by Oji Corn Starch K.K.) is prepared to conduct size press coating. The product is calendered for smoothing without coating calcium chloride to obtain a recording paper having a basis weight of 56 g/m². An internal bond strength is 0.29 N·m.

<Recording Paper 13>

A pulp (100 parts by weight) containing a hard wood craft pulp of which the freeness is adjusted to 470 ml by beating and a dry pulp made of a hard wood craft pulp at a weight ratio of 80 to 20 is mixed with 14 parts by weight of precipitated calcium carbonate as a filler, 7 parts by weight of kaolin and 0.1 part by weight of alkylketene dimer (AKD) as an internal sizing agent, and the mixture is subjected to paper-making. Further, a coating solution containing 94 parts by weight of water, 1 part by weight of cationized starch (Ace K, made by Oji Corn Starch K.K.) and 5 parts by weight of magnesium chloride is prepared to conduct size press coating. The product is calendered for smoothing to obtain a recording paper in which magnesium chloride is coated on both surfaces in a coating amount of 1 g/m² for one surface and a basis weight is 76 g/m². An internal bond strength is 0.11 N·m.

Example 1

Printing is conducted with a thermal ink jet recording apparatus using a combination of ink set 1 and recording paper 9, and various evaluations are performed. The printing is conducted in an atmosphere of 23° C. and 55% RH using an evaluation bench of multi-pass printing with four recording heads as an ink jet recording apparatus. In the printing, a nozzle pitch is 800 dpi, the number of nozzles is 256, a drop amount is approximately 15 pl, a printing mode is single-sided batch printing, and a head scanning speed is approximately 28 cm/sec.

The various evaluations are described below.

Evaluation of Curling Immediately After Printing

A 100% cyan solid image is printed on a recording paper of A4 size, and an amount of curling that occurs on a surface opposite to a printed surface immediately after printing is measured. The measurement is conducted such that the printed surface of the recording paper is laid downward and heights of four corners are measured with calipers to find an average value. An evaluation standard is as described below, and A and B are permissible levels.

A: less than 10 mm

B: at least 10 mm and less than 20 mm

C: at least 20 mm and less than 30 mm

D: at least 30 mm

Evaluation of Cockling Immediately After Printing

A 5 cm-square 100% secondary color solid image (blue) is printed on a recording paper of A4 size, and a maximum height of cockling occurring immediately after printing is measured with a CCD laser displacement meter (LK 030, manufactured by Keyence). An evaluation standard is as described below, and A and B are permissible levels.

A: less than 1 mm

B: at least 1 mm and less than 2 mm

C: at least 2 mm and less than 3 mm

D: at least 3 mm

Evaluation of Curling After Allowing to Stand and Drying

A 100% cyan solid image is printed on a recording paper of A4 size, and allowed to stand in an atmosphere of 23° C. and 55% RH with a printed surface laid upward. An amount of curling that occurs after 24 hours is measured. The measurement is conducted such that the printed surface of the recording paper is laid downward and heights of four corners are measured with calipers to find an average value. An evaluation standard is as described below, and A and B are permissible levels.

A: less than 10 mm

B: at least 10 mm and less than 20 mm

C: at least 20 mm and less than 30 mm

D: at least 30 mm

Evaluation of Cockling After Allowing to Stand and Drying

A 5 cm-square 100% secondary color solid image (blue) is printed on 5 positions of a recording paper of A4 size, and the resulting recording paper is allowed to stand in an atmosphere of 23° C. and 55% RH with a printed surface laid upward. A condition of cockling occurring after 24 hours is visually evaluated. An evaluation standard is as described below, and A and B are permissible levels.

A: no cockling

B: Cockling is slightly observed but negligible.

C: Cockling occurs, which is appreciable.

D: Cockling occurs greatly.

Evaluation of a Color Reproduction

With respect to densities of solid patches of cyan, magenta, yellow, red, green and blue colors after 1 day from the printing, $L^*a^*b^*$ is measured with D50 light source and 2° visual field using X-Rite 938 (manufactured by X-Rite). A color reproduction region is calculated, and evaluated as follows.

A: A color reproduction region is at least 9,000.

B: A color reproduction region is at least 8,000 and less than 9,000.

C: A color reproduction region is at least 7,000 and less than 8,000.

D: A color reproduction region is less than 7,000.

Evaluation of Inter-color Bleeding

Printing is conducted such that black ink and color ink are contacted with each other in the form of 2 cm-square patches. The color mixture of the printed products in contact with each other is organoleptically evaluated according to the following standard.

A: No inter-color bleeding is observed at all.

B: inter-color bleeding slightly occurs, which is negligible and not practically problematic.

C: inter-color bleeding occurs, which is slightly appreciable and practically problematic.

D: inter-color bleeding occurs, which is appreciable and not permissible.

Evaluation of Character Feathering

Characters of 8 point as a font size are printed with black ink and cyan ink. Printing qualities are visually evaluated according to the following standard.

A: No feathering is observed at all on kanji (Chinese character) and hiragana (Japanese cursive syllabary).

B: feathering is observed on a small part of kanji and hiragana, which is not practically problematic, though.

C: feathering is observed on a part of kanji and hiragana, which is practically problematic.

D: feathering is observed on kanji and hiragana.

Evaluation of Double-sided Printing

A 100% cyan solid image is printed on one surface of a recording paper of A4 size. Immediately after the printing paper is fed out, the opposite surface thereof is set, and a 100% cyan solid image is printed thereon. The printed recording paper is visually evaluated according to the following standard.

A: There is no trace of rubbing with a head, and cockling of the paper is not appreciable either.

B: There is no trace of rubbing with a head, but cockling of the paper is slightly appreciable, which is not practically problematic, though.

C: A trace of rubbing with a head occurs, and cockling of the paper is also appreciable, which is practically problematic.

D: A trace of rubbing with a head greatly occurs, and cockling of the paper is also appreciable, which is practically problematic.

The results are shown in Table 1.

Examples 2 to 8 and Comparative Examples 1 to 7

The combinations of inks and recording papers shown in Table 1 are evaluated as in Example 1.

The results of these Examples and Comparative Examples are shown in Table 2.

TABLE 1

| | Ink | | | Recording paper | | |
|---|---|---|---|---|---|---|
| | Ink set No. | Surface tension (mN/m) | Addition of anionic compound | Recording paper No. | Basis weight (g/m$^2$) | Internal bond strength (N · m) | Coating amount of polyvalent metal salt for one surface (g/m$^2$) |
| Ex. 1 | 1 | 26 | no | 9 | 64 | 0.10 | 0.1 |
| Ex. 2 | 2 | 33 | no | 5 | 65 | 0.06 | 1 |
| Ex. 3 | 1 | 26 | no | 4 | 76 | 0.06 | 1 |
| Ex. 4 | 2 | 33 | no | 4 | 76 | 0.06 | 1 |
| Ex. 5 | 2 | 33 | no | 7 | 76 | 0.11 | 1 |
| Ex. 6 | 2 | 33 | no | 8 | 76 | 0.19 | 1 |
| Ex. 7 | 2 | 33 | no | 2 | 100 | 0.05 | 1 |
| Ex. 8 | 3 | 33 | yes | 8 | 76 | 0.19 | 1 |
| Ex. 9 | 2 | 33 | no | 13 | 76 | 0.11 | 1 |
| Comp. Ex. 1 | 2 | 33 | no | 12 | 56 | 0.29 | 0 |
| Comp. Ex. 2 | 2 | 33 | no | 6 | 58 | 0.06 | 2 |
| Comp. Ex. 3 | 4 | 22 | no | 4 | 76 | 0.06 | 1 |
| Comp. Ex. 4 | 2 | 33 | no | 11 | 76 | 0.30 | 1 |
| Comp. Ex. 5 | 2 | 33 | no | 1 | 100 | 0.05 | 0 |

TABLE 1-continued

| | Ink | | | | Recording paper | | Coating amount of polyvalent metal salt for one surface (g/m$^2$) |
|---|---|---|---|---|---|---|---|
| | Ink set No. | Surface tension (mN/m) | Addition of anionic compound | Recording paper No. | Basis weight (g/m$^2$) | Internal bond strength (N · m) | |
| Comp. Ex. 6 | 4 | 22 | no | 3 | 102 | 0.05 | 2 |
| Comp. Ex. 7 | 2 | 33 | no | 10 | 102 | 0.29 | 2 |

TABLE 2

| | Curling immediately after printing | Cockling immediately after printing | Curling after allowing to stand and drying | Cockling after allowing to stand and drying | Color reproduction | Inter-color bleeding | Black character image quality | Cyan character image quality | Double-sided printing property |
|---|---|---|---|---|---|---|---|---|---|
| Ex. 1 | B | B | B | B | B | B | B | B | B |
| Ex. 2 | B | B | B | B | A | A | A | A | B |
| Ex. 3 | B | B | B | B | B | A | B | B | B |
| Ex. 4 | A | A | A | A | A | A | A | A | A |
| Ex. 5 | A | A | A | A | A | A | A | A | A |
| Ex. 6 | B | B | B | B | A | A | A | A | B |
| Ex. 7 | A | A | A | A | A | A | A | A | A |
| Ex. 8 | A | A | A | A | A | A | A | A | A |
| Ex. 9 | B | A | B | B | A | A | B | B | A |
| Comp. Ex. 1 | D | D | D | D | D | D | D | D | D |
| Comp. Ex. 2 | C | C | C | C | A | A | A | A | C |
| Comp. Ex. 3 | C | C | C | C | A | A | A | A | C |
| Comp. Ex. 4 | D | D | D | D | A | C | A | A | D |
| Comp. Ex. 5 | C | C | C | C | D | D | D | D | C |
| Comp. Ex. 6 | C | C | C | C | A | A | A | A | C |
| Comp. Ex. 7 | C | C | C | C | A | B | A | A | C |

As shown in Table 2, when the recording is conducted by the ink jet recording method of the invention in Examples, the image quality is good, as well as no practical problem arises on curling and cockling immediately after printing and curling and cockling after allowing to stand and drying.

On the other hand, in the ink jet recording method in Comparative Examples, problems arise with respect to the image quality and/or curing and cockling.

Thus, the invention can provide the ink jet recording method in which in a document printed by an ink jet recording system, the color reproduction is increased, the inter-color bleeding and the feathering of black character and color character are reduced, the double-sided printability is provided by reducing curling and cockling occurring immediately after printing and curling and cockling occurring after allowing to stand and drying are also reduced.

The entire disclosure of Japanese Patent Application No. 2002-169820 filed on Jun. 11, 2002 including specification, claims and abstract is incorporated herein by reference in its entirety.

What is claimed is:

1. An ink jet recording method comprising a step of printing on a recording paper by using a pigment ink of at least one color, the recording paper comprising a base paper and a coating, the base paper comprising a pulp fiber and a filler, the coating comprising a polyvalent metal salt, and the coating amount on one surface of the base paper being from 0.1 to 3 g/m$^2$, the recording paper having a basis weight of from 63 to 100 g/m$^2$ an internal bond strength of from 0.05 to 0.2 N·m, the pigment comprising a water-soluble organic solvent, water and a surfactant and having a surface tension of from 25 to 37 mN/m.

2. The ink jet recording method of claim 1, wherein both surfaces of the recording paper are printed.

3. The ink jet recording method of claim 1, wherein the ink contains an anionic compound.

4. The ink jet recording method of claim 3, wherein the anionic compound comprises a hydrophilic moiety and a hydrophobic moiety.

5. The ink jet recording method of claim 1, wherein the Stöckigt sizing degree of the base paper is at least 10 seconds and less than 60 seconds.

6. The ink jet recording method of claim 1, wherein the polyvalent metal salt is selected from a calcium salt, a magnesium salt and an aluminum salt.

7. The ink jet recording method of claim 1, wherein the viscosity of the ink is from 1.5 to 5.0 mPa·s.

8. The ink jet recording method of claim 1, wherein the air permeability of the base paper is from 10 to 30 seconds.

9. The ink jet recording method of claim 1, wherein the Stöckigt sizing degree of the paper is from 10 to 60 seconds.

10. The ink jet recording method of claim 1, wherein the mixing amount of the filler is from 5 to 30 parts by weight per 100 parts by weight of the pulp fiber.

11. The ink jet recording method of claim 1, wherein the pulp fiber comprises a waste pulp, and wherein the mixing amount of the waste pulp is from 50 to 100% by weight based on the total amount of the pulp fiber.

12. An ink jet recording paper comprising a base paper and a coating, the base paper comprising a pulp fiber and a filler, the coating comprising a polyvalent metal salt and the coating amount on one surface of the base paper being from 0.1 to 3 g/m$^2$, the recording paper having a basis weight of from 63 to 100 g/m$^2$ and an internal bond strength of from 0.05 to 0.2 N·m.

13. The ink jet recording paper of claim 12, wherein both surfaces of the base paper are coated with a polyvalent metal salt.

14. The ink jet recording paper of claim 12, wherein the Stöckigt sizing degree of the base paper is at least 10 seconds and less than 60 seconds.

15. The ink jet recording paper of claim 12, wherein the polyvalent metal salt is selected from a calcium salt, a magnesium salt, and an aluminum salt.

16. The ink jet recording paper of claim 12, wherein the air permeability of the base paper is from 10 to 30 seconds.

17. The ink jet recording paper of claim 12, wherein the Stöckigt sizing degree of the paper is from 10 to 60 seconds.

18. The ink jet recording paper of claim 12, wherein the mixing amount of the filler is from 5 to 30 parts by weight to 100 parts by weight of the pulp fiber.

19. The ink jet recording paper of claim 12, wherein the pulp fiber comprising a waste pulp with a mixing amount of the waste paper pulp is from 50 to 100% by weight based on the total amount of the pulp fiber.

* * * * *